(12) United States Patent
Somin et al.

(10) Patent No.: US 7,188,254 B2
(45) Date of Patent: Mar. 6, 2007

(54) PEER-TO-PEER AUTHORIZATION METHOD (75) Inventors: Grigori M. Somin, Seattle, WA (US);
David Mowers, Issaquah, WA (US);
Alexandru Gavrilescu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 722 days.

(21) Appl. No.: 10/645,319

(22) Filed: Aug. 20, 2003

(65) Prior Publication Data
US 2005/0044411 A1    Feb. 24, 2005

(51) Int. Cl.
*G06F 9/00*    (2006.01)

(52) U.S. Cl. ............... 713/185; 713/193; 713/161; 713/182

(58) Field of Classification Search ............. 713/185, 713/193, 161, 182
See application file for complete search history.

(56) References Cited

U.S. PATENT DOCUMENTS

| | | | |
|---|---|---|---|
| 6,412,070 B1 | 6/2002 | Van Dyke et al. | |
| 2002/0166052 A1 | 11/2002 | Garg et al. | |
| 2003/0056093 A1 | 3/2003 | Huitema et al. | |
| 2003/0182428 A1 | 9/2003 | Li et al. | |
| 2003/0204742 A1 | 10/2003 | Gupta et al. | |
| 2003/0212806 A1 | 11/2003 | Mowers et al. | |
| 2004/0034776 A1 | 2/2004 | Fernando et al. | |
| 2004/0111469 A1 | 6/2004 | Manion et al. | |
| 2004/0111515 A1 | 6/2004 | Manion et al. | |

*Primary Examiner*—Thomas R. Peeso
(74) *Attorney, Agent, or Firm*—Marshall, Gerstein & Borun LLP (57) ABSTRACT

Disclosed are peer-to-peer computer program products, methods, and systems in which a remote peer on a peer-to-peer network is granted or denied access to a resource based on the credentials presented by the remote peer. In accordance with the disclosed subject matter, an access token that includes one or more security identification values which represent respectively one or more access rights in an access control system is generated. An execution thread that is associated with the access token thus generated attempts to access the resource on behalf of the remote peer. In some embodiments, the access control system includes a generic user account, and the access token that is generated for the remote peer includes the security identification value associated with the generic user account in the access control system.

47 Claims, 5 Drawing Sheets

| ACCOUNT SID | 1-9-21-B1B2B3B4 |
|---|---|
| GROUP 1 SID | 1-9-21-B5B6B7B8 |
| GROUP 2 SID | 1-9-21-B6B7B8B9 |
| PRIVILEGE 1 | XXXXXXXXXXXX |
| PRIVILEGE 2 | YYYYYYYYYYYY |

FIG. 6

PEER-TO-PEER AUTHORIZATION METHOD

FIELD OF THE INVENTION

This invention pertains to computer networking systems, and in particular peer-peer request handling within computer networks.

BACKGROUND OF THE INVENTION

Peer-to-peer networks and file sharing systems are becoming more popular and commercially usable. Generally, the peer-to-peer computing model is deemed to be different from and more versatile than the client-server model of computing, in that each computer on a peer-to-peer network can serve as a client and/or as a server. Peer-to-peer networks are becoming widely used for purposes such as file sharing, interpeer communication, workgroup collaboration, and numerous other business and recreational purposes. More information about peer-to-peer networks may be found generally in Manion et al., U.S. pending patent application Ser. No. 10/309,864, entitled "Peer-to-Peer Identity Management Interfaces and Methods," and in Manion et al., U.S. pending patent application Ser. No. 10/351,727, entitled "Peer-to-Peer Networking Framework Application Programming Interfaces." Peers on a peer-to-peer network are said to reside on a "graph," and some subsets of the peers may be considered as groups within the graph, as described in U.S. pending patent application Ser. No. 10/309,865, entitled "Peer-to-Peer Graphing Interfaces and Methods" and in U.S. pending patent application Ser. No. 10/351,905, entitled "Peer-to-Peer Grouping Interfaces and Methods," respectively.

On peer-to-peer networks, it can be difficult to enable authentication of a remote peer. Generally, a peer on a network is identified by its credentials, which generally consists of the peer's name and user password. Many network security protocols exist to authenticate users on a network and differentiate between users for purposes of granting differential access rights, but heretofore it has a difficult to differentiate between remote peer-to-peer users. More specifically, although it has been possible to grant or deny a remote peer access to a peer-to-peer group or set of network resources, it has been difficult to differentiate between peers and to provide a different level of access to one peer than to another peer where both peers are allowed access to at least some network resources. Peers may comprise users on entirely different networks which have entirely different security infrastructures, and the security mechanism of a remote peer's network may not be compatible with the security infrastructures on the network on which the peer is seeking access. Moreover, as a general matter peer nodes on a peer-to-peer network generally are deemed to be less "trusted" than nodes on a secure domain. Thus, while a remote peer may be granted or denied access to a group or a set of network resources on an "all-or-nothing" basis, it is difficult to assign peers different levels of user rights.

SUMMARY OF THE INVENTION

The invention seeks to provide a method and system that enable differentiation between peers users on a peer-to-peer network. Generally, the invention seeks to provide a method for allowing a peer on a peer-to-peer network to access a resource, and to provide a computer program product that enables such differentiated access.

The invention provides in one embodiment a method for allowing a remote peer on a peer-to-peer network to access a resource. Upon receiving a request from a remote peer to access a resource, the method comprises accessing one or more security identification values which represent respectively one or more access rights of the remote peer in an access control system. The method further comprises generating an access token for the access control system, the access token comprising the security identification values thus accessed. In accordance with the invention, an operation (e.g., a process/thread) is called upon to access the resource on behalf of the remote peer, whereby the access control system determines the level of access to the resource based on the one or more access security identification values in the access token.

The invention is designed to complement known security protocols. More particularly, a responder peer user is assigned an access token with security identification values assigned to a particular remote peer, thereby allowing differentiation between remote peers when a responder peer carries out a request of a remote peer (initiator) on the peer-to-peer network.

Numerous embodiments of the invention are contemplated. For instance, the invention is embodied in a computer program product for use on a computer that is capable of connecting to at least one other computer in a peer-to-peer networking environment. The computer has an access control system for determining the level of access to a resource based on one or more security identification values in an access token associated with the remote peer that is attempting to access the resource. The computer program product includes code for receiving a request to access a resource from a remote peer, code for accessing one or more security identification values which represents one or more access right designations of the remote peer in the access control system, code for generating an access token for use in conjunction with the access control system, the access token comprising the one or more security identification values, and code for invoking/initiating an operation for accessing the resource on behalf of the remote (request initiator) peer.

Other features and embodiments to the invention are described by way of example hereinbelow.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE PREFERRED EMBODIMENTS

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 1:
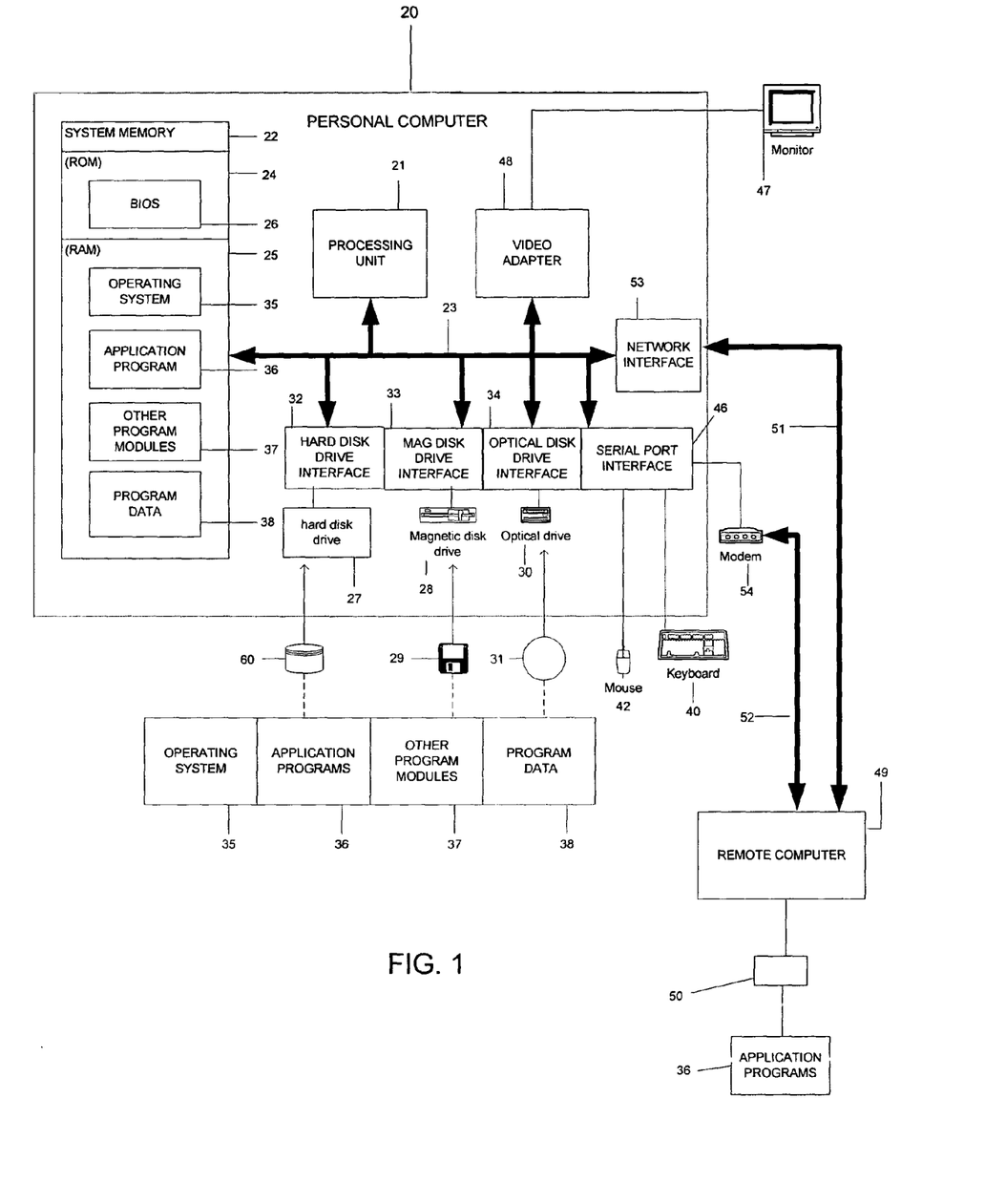
FIG. 1 is a block diagram that generally illustrates a computer system on which the computer programs and methods described herein may be implemented.

The following description begins with a description of a general-purpose computing device that may be used in an exemplary system for implementing the invention. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
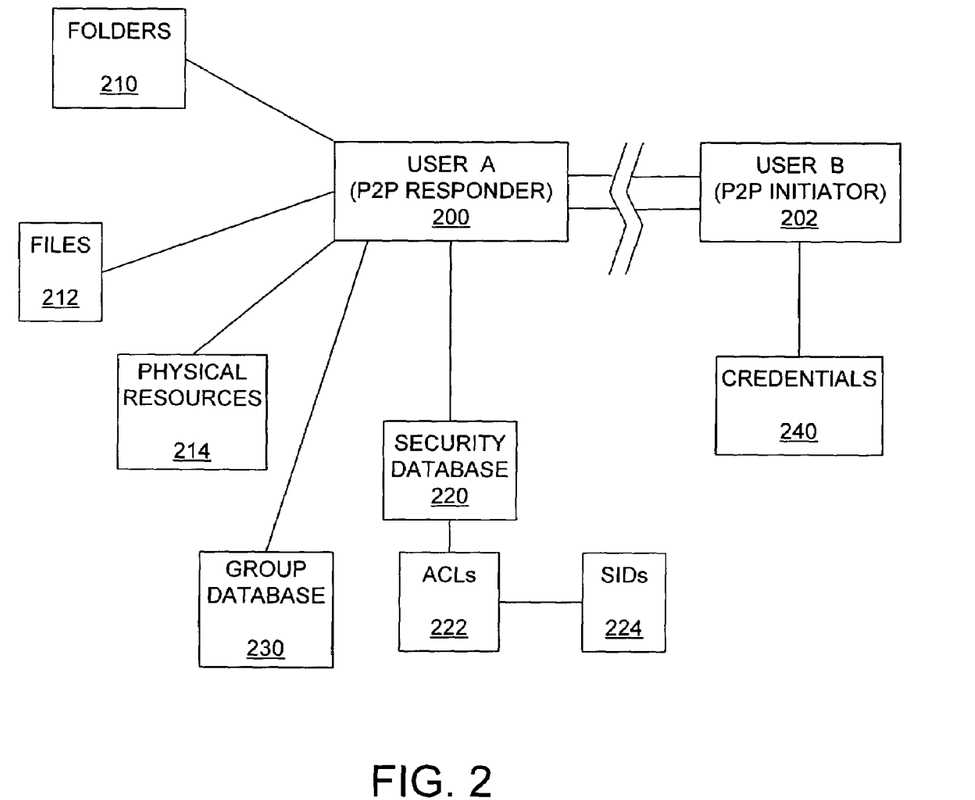
FIG. 2 is a logical representation of remote (initiator) and local (responder) peers on a peer-to-peer network.

With reference to FIG. 2, a User A 200 represents a trusted user on a network domain that carries out a peer-to-peer responder role in an illustrative embodiment of the present invention. A User B 202 represents a peer-to-peer initiator that seeks access to network resources reachable through User A 200. As illustrated in FIG. 2, network resources include resources accessible to the User A 200 such as: file service objects including folders 210 and files 212, processes, and physical resources 214 such as a printer or other output device. Other resources are provided via the User A 200 in accordance with various embodiments of the invention. The User A 200 in the illustrative embodiment is associated with a physical computer system running a product/service selected from among the Microsoft Windows® operating systems—though other operating system are also suitable for carrying out the present invention.

In particular embodiments of the invention, known security protocols native to 32-bit Windows® operating systems provide for security for standard Windows®-securable objects. Using an API known as the "security support provider interface," which is implemented through a security support provider dynamically linked code library (.dll), a security database 220 comprising a listing of rights in the access control system is provided. The security database 220 supports access control lists ("ACLs") 222 which, in-turn include a set of access control entries (ACEs) that reference a security identifications (SIDs) 224 and corresponding access masks (defining access rights for the particular resource—such as a process, file, or event—with which the ACE is associated). A discretionary access control list, i.e., one controlled by the owner of an object, is provided for certain objects in embodiments of the invention, but in any case a systemwide ACL is generally provided. Each SID referenced by an ACE in an access control list corresponds, by way of example, to a resource group or to a role in the resource group. Certain peer-to-peer objects (such as record types) are not natively securable under the Windows® 32-bit operating systems. For such objects, a group database 230 is provided, whereby a similar access control list coordinated through the use of various SIDs is employed.

With further reference to FIG. 2, User B 202 is associated with a second physical computer system on another node on the peer-to-peer network to which the User A 200 belongs. In some embodiments, User A 200 and User B 202 communicate via graphing and grouping protocols described in the heretofore identified Manion patent applications. Further details concerning the structure of peer-to-peer networks can be found in Manion et al., U.S. pending patent application Ser. No. 10/351,726 entitled "Peer-to-Peer Record Structure and Query Language for Searching and Discovery Thereof," Miller, U.S. pending patent application Ser. No. 10/122,863, entitled "Multi-Level Cache Architecture and Cache Management Method for Peer-to-Peer Name Resolution Protocol," Huitema et al., U.S. pending patent application Ser. No. 09/955,923, entitled "Peer-to-Peer Group Management and Method for Maintaining Peer-to-Peer Graphs," and Huitema et al., U.S. pending patent application Ser. No. 09/956,260, entitled "Peer-to-Peer Name Resolution Protocol (PNRP) Security Infrastructure and Method." Group security infrastructure is discussed in Huitema et al., U.S. pending patent application Ser. No. 09/955,924, entitled "Peer-to-Peer Name Resolution Protocol (PNRP) Group Security Infrastructure and Method." The graphing and grouping protocols discussed herein comprise a set of application programming interfaces (APIs). The graphing API establishes an infrastructure for the peer-to-peer network, and it assures that each node on the peer-to-peer network has a consistent view of data in the peer-to-peer "graphs." The graphing API includes functions for determining and monitoring a set of peers who have entered the network, those who have left the network, and so forth. The grouping API provides many functions allowing multiple applications to use one graph and one identity and providing group security functions for private group security.

Upon receiving a request to access a resource from User B 202 (a peer-to-peer initiator) including a set of credentials 240 (for identifying and authenticating the User B 202 to the User A 200), security/access limiting mechanisms operating on the User A 200 decide whether to grant the requested resource access to User B 202. In this respect, the "access" granted to the User B 202 refers, for example, to a level of permission granted to a resource. For example, some users are allowed to read from and write to a file, some users are allowed only to read from a file, and some users may not have access at all to the file.

Figure 3:
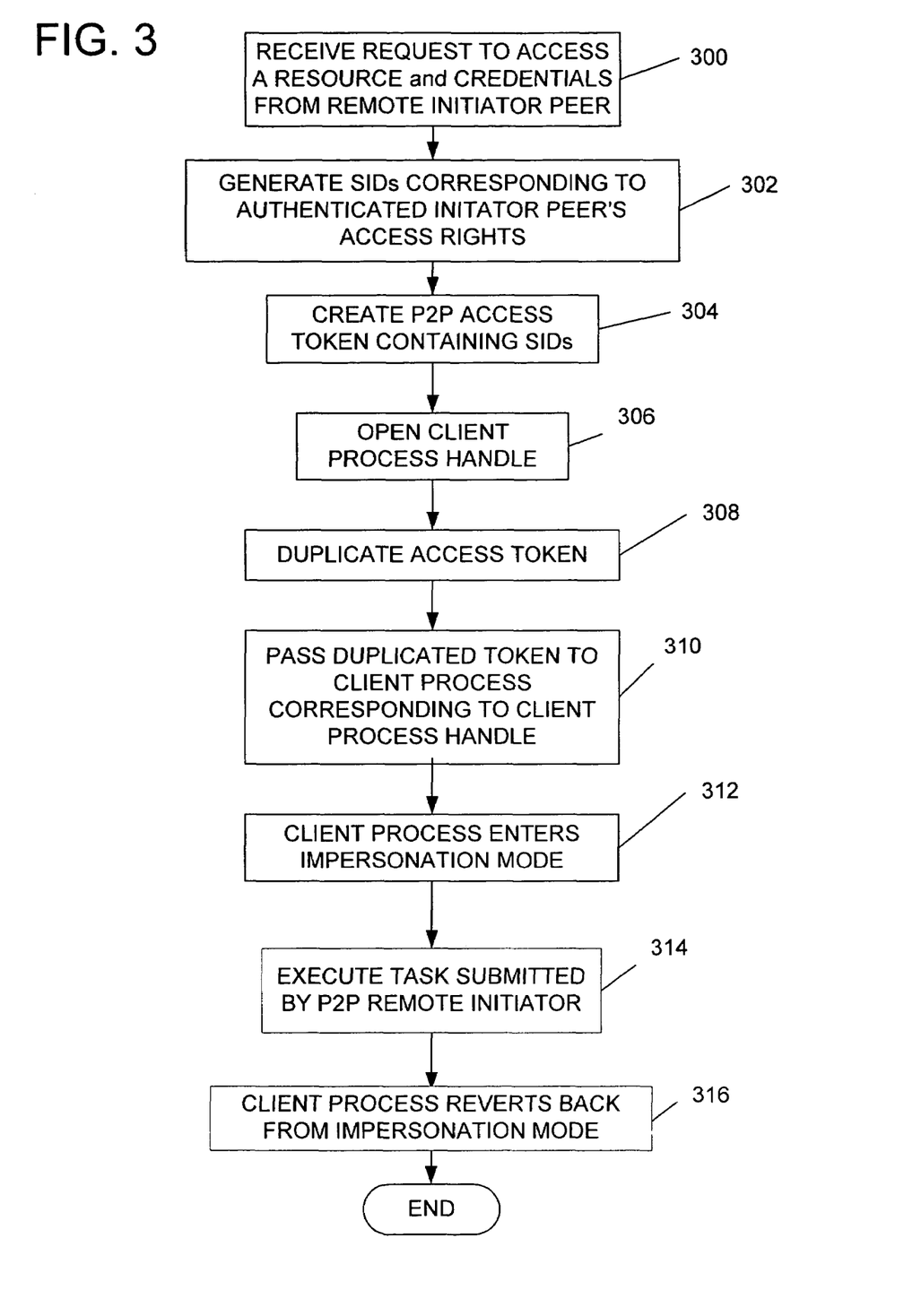
FIG. 3 is a flowchart representation of steps in an exemplary method for enabling a responder peer to impersonate a remote initiator peer to access a resource.

An exemplary set of steps executed on a responder peer (e.g., User A 200) for carrying out a peer-to-peer request issued by a peer-to-peer initiator (e.g., User B 202) are depicted in FIG. 3. At step 300, User A 200 (the responder peer) receives a request to access a resource and credentials from a remote request initiator peer (e.g., User B 202). Next, at step 302, SIDs are generated based upon the credentials that accompanied the received request. In an embodiment of the invention, during step 302 the SIDs are generated as a hash of the peer name of the requesting (remote) peer. Such peer names are well known in the art. At step 304, a peer-to-peer access token is created that contains the SIDs previously generated during step 302.

In an embodiment of the invention, the request issued by the initiator peer (e.g., User B 202) is carried out by an existing (already running) client process, which executes on the responder peer (e.g., User A 202), that is separate from a peer-to-peer process (or processes) that carries out steps 300, 302 and 304. In such case, a process handle for the existing client process, that will submit the actual request on the responder peer (e.g., User A 202), is opened during step 306. At step 308 a duplicate access token is created of the peer-to-peer access token previously created during step 304. It is noted that duplication of the access token can be achieved in a variety of ways including both making a copy of the token itself and, alternatively creating a handle (or other reference) to the existing token. Thus, a duplicate token is, by way of example, a reference to the original token structure generated during step 304 or a copy of the token structure.

Thereafter, at step 310 the duplicate access token is passed to the existing client process executing on the responder peer (e.g., User A 202) that will submit the actual request issued by the initiator peer (e.g., User B 202). In an embodiment of the invention, after receiving the duplicate access token, during step 312 the client process enters an impersonation mode of operation corresponding to the initiator peer (and having access rights determined by the passed duplicated token). In an embodiment of the invention, such state is entered during step 312 by a call to an ImpersonateSecurityContext method. While in the impersonation mode, the client process possesses the access rights of the remote initiator peer (as determined by the access token created during step 304).

During step 314, while in the impersonation mode, the client process submits the request of the initiator peer (e.g., User B 202), along with the duplicated token, for execution by a particular resource accessible by the responder peer (e.g., User A 200). The permissibility of the request is thus determined by the access rights granted by the requested resource to the initiator peer rather than the responder peer that actually submitted the request to the resource. Furthermore, step 314 contemplates including routines for notifying the initiator peer of a denial of access to the resource as well as reporting successful completion of a request and any results of the request (steps not shown). After receiving a response (i.e., the request was rejected, executed, etc) and passing the response back to the initiator peer (e.g., User B 202), at step 316 the client process, through a call to a RevertSecurityContext method, reverts back to its prior mode of operation (i.e., its mode before entering the impersonation mode at step 312).

Having described an exemplary sequence of steps for carrying out a peer-to-peer request, it is noted that in an alternative embodiment of the invention, the request is not passed to another existing client process on the responder peer. Instead, after generating an access token at step 304, a process that performed the initial steps 300, 302 and 304 also carries out steps 312, 314 and 316. By way of example and not limitation, after creating an access token for the initiator peer during step 304, the token is assigned to a thread created within the process to carry out the request through an impersonation role/mode assigned specifically to the thread (e.g., using the known SetThreadToken call). In this case the new thread impersonates the remote initiator peer while performing step 314. Thereafter, in a step analogous to step 316, the thread is killed (rather than reverted back to a pre-impersonation state/context).

In yet another alternative embodiment of the invention, rather than relying upon an existing client process, a new process is started. In this case, rather than opening a client process handle (to an existing client process), a new process is launched and a handle is created (rather than merely opened) during step 306. The new process is killed, rather than reverting, in a step analogous to step 316.

Figure 5:
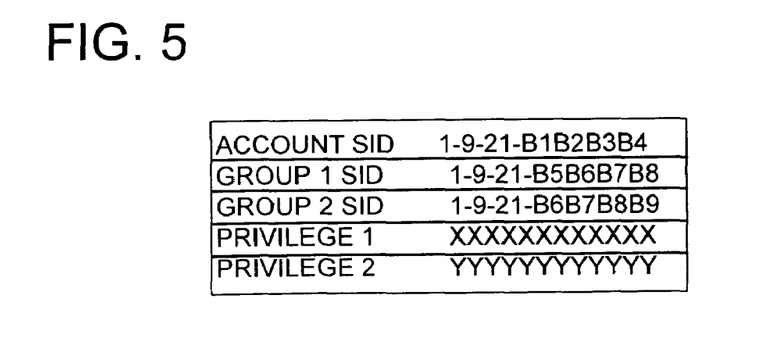
FIG. 5 is a representation of the data structure of an access token for a remote initiator peer.

As demonstrated by the above examples, there are a variety of contemplated ways to attach access rights/limitations to a request from an initiator peer to be executed on a responder peer through impersonation of the initiator peer. Regardless of whether or not a second (existing/new) client process is called upon to impersonate the initiator peer, in each instance the requesting execution operation (e.g., process, thread, etc.) enters a mode of impersonation having access rights established according to an access token determined by credentials associated with (provided by) the remote initiator peer. In accordance with the various disclosed methods for impersonating the remote initiator peer, the level of access granted the initiator peer to a requested resource accessed via the responder peer is determined based on the SIDs in the access token generated for the remote initiator peer. For instance, with reference to FIG. 5, a generic user account SID is included in the access token, along with group SIDs and privilege SIDs corresponding to groups and privileges within a group with which the initiator peer is associated (as opposed to the responder peer).

Figure 4:
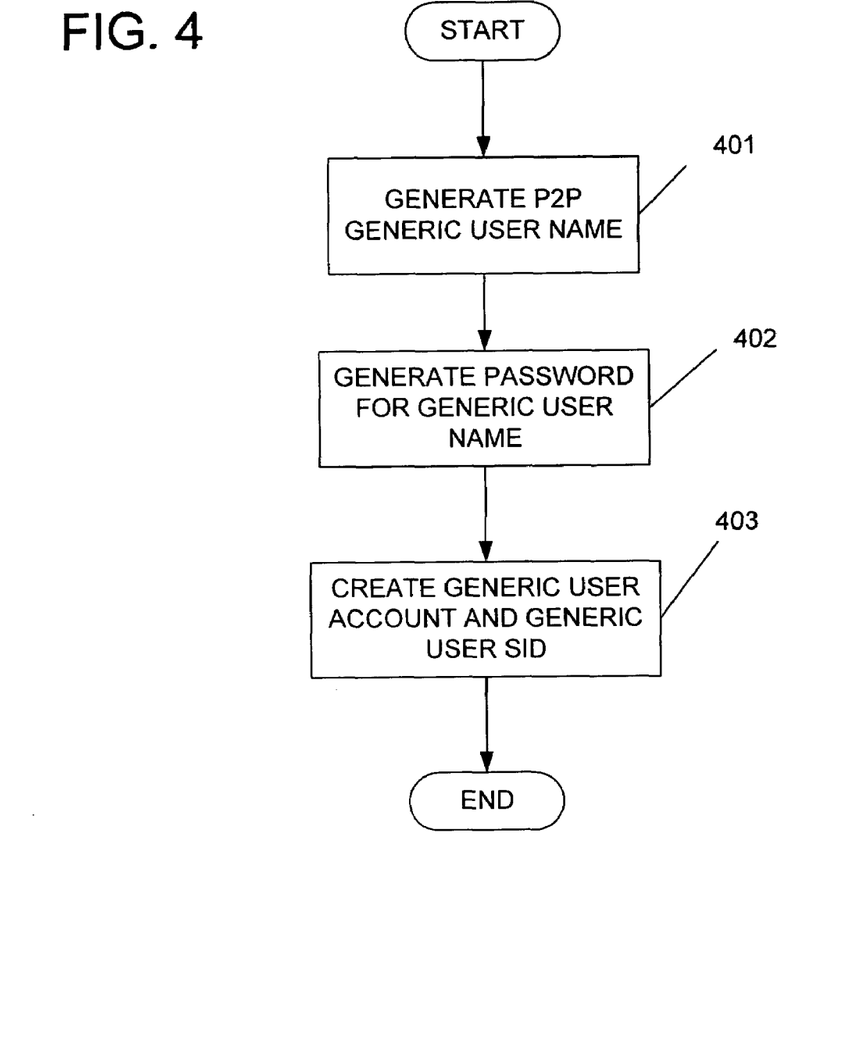
FIG. 4 is a flowchart representation of steps in a method for generating a generic peer user account from which specific remote peer accounts a created.

The access token is generated during step 304 to correspond to a user in the network domain. In particular embodiments of the invention, a generic, "peer-to-peer" user account is generated that does not correspond to any groups or access rights. Thus, only the SIDs corresponding to access rights of the remote peer are included in an access token generated for such account. In an embodiment of the invention, the generic user exists as a placeholder/seed and is not identified in the SIDs within the ACLs associated with the resources. With reference to FIG. 4, the first time that the invention is employed on the network, a peer-to-peer generic user name is created at step 401 and a password is generated for the generic user as step 402. At step 403, a generic user account and generic user SID is generated for the access control system. The generic user password may be any suitable password but in practice should be a cryptographically strong password that includes random number elements and incorporates at least one lower case letter, one upper case letter, one numeral, and one symbol.

The invention is deemed to comprise the methods herein described and in other embodiments code that implements the foregoing methods. Also encompassed by the invention as described herein is code that further includes the access control system and the security API heretofore described. A product prepared in accordance with the invention may further comprise user-installable installation code that places a computer readable program product onto a medium readable by the computer. Known installation techniques and file formats (e.g., Windows® cabinet files) may be employed. The installation code may be delivered via any suitable means, such as over a network or in a physical format, such as any computer-readable medium.

Figure 6:
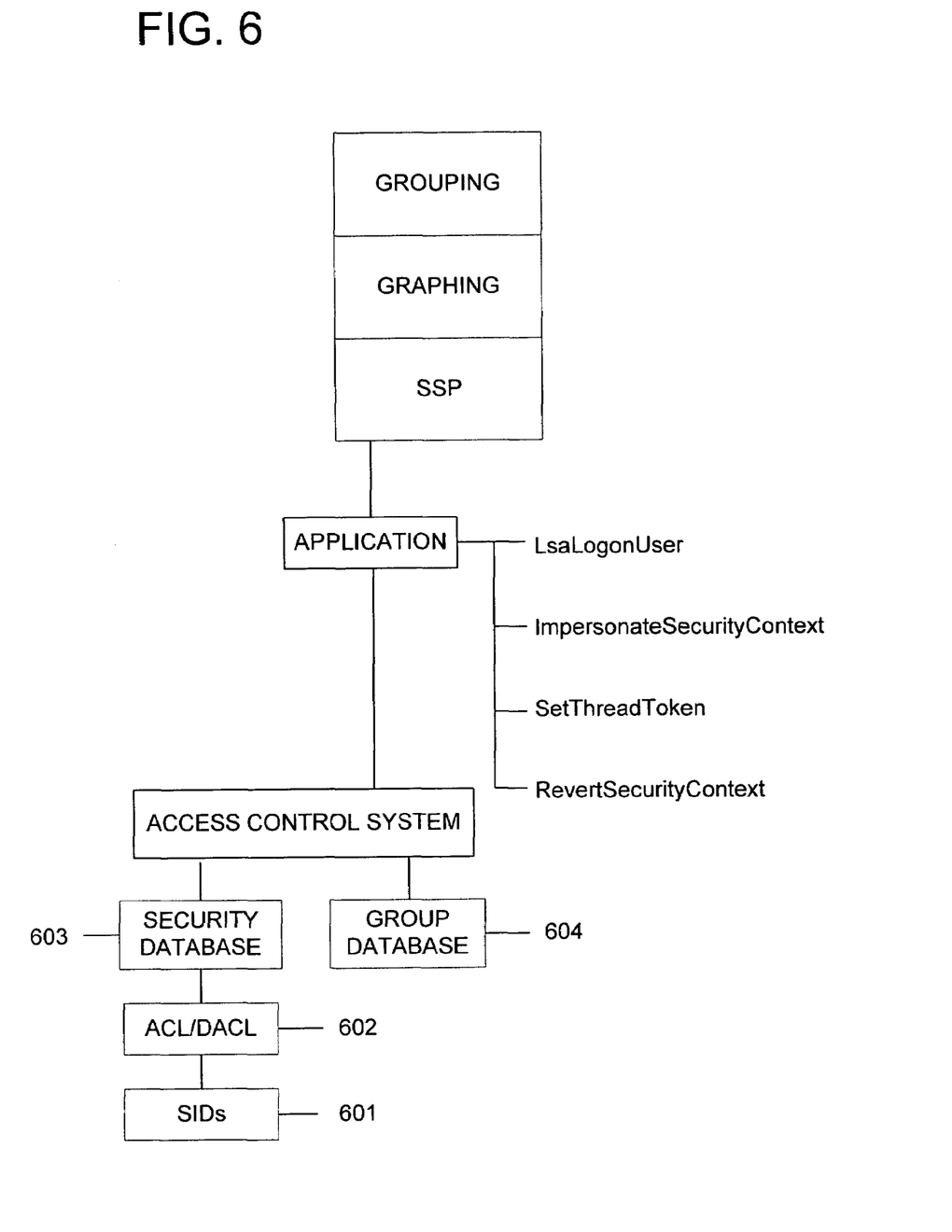
FIG. 6 is a logical representation of a local responder system for carrying out remote initiator peer requests, by a local responder peer, according to particular access rights associated with credentials supplied by the remote initiator peer in a peer-to-peer network environment.

With reference to FIG. 6, each Windows® principal, such as a user, group, or logon session, is represented by a SID 601 in the access control list or distributed access control list 602 that are part of security database 603 or group database 604. The invention is contemplated to be useful in conjunction with four functions including LsaLogonUser, ImpersonateSecurityContext, SetThreadToken, and RevertSecurityContext. LsaLogonUser is a function used to create a security token, and in the context of the present invention, is used to create a security token on behalf of the remote peer. If successful, this function returns an access token containing the generic user account SID and the access control SIDs corresponding to access rights of the remote peer. ImpersonateSecurityContext and Set Thread Token are functions, by which User A impersonates User B by setting the thread token to the access token returned by LsaLogonUser. RevertSecurityContext (which along with ImpersonateSecurityContext is part of the security support provider interface) is the function by which User A reverts from the impersonation of the remote peer for running other processes on behalf of User A itself (see step 316 of FIG. 3). These functions are well known in the Windows® NT architecture; in peer space, a peer group is deemed analogous to an NT domain, a peer group is deemed analogous to a NT group, and a peer user is deemed analogous to an NT user.

The group database 604 contains security descriptors, each of which is a data structure for an object that includes the SID of the owner (e.g., peer user or group owner who can modify access to the object), and the discretionary ACLs. Standard Windows® security descriptors allow for another parameter, the SID of the primary group, to be used, but this SID preferably is not used in connection with the invention in some embodiments. Each ACL includes a list of access control entries (ACEs), each of which allows or denies access to the object to a security principal based on the SID of the principal. Each access control entry contains a SID and an "access control mask," which is a bit array corresponding to a Windows® right or object-specific right. Thus, each access control entry defines an access control mask for every SID (principal). Standard Windows® rights include rights such as delete, read-control, write-owner, file-execute, and others. Object specific rights are defined by the group owner. The Windows® AuthZ API verifies the access token against the access control list and grants or denies access to the resource to the remote peer.

Thus, upon receiving a request from a remote peer, LsaLogonUser is called to create an access token on behalf of the remote peer. Using ImpersonateSecurityContext and SetThreadToken, an execution thread, process or other execution operation is called/initiated to submit a request on the responder peer node on behalf of the remote peer in an attempt to access the resource. Upon completion of the request, RevertSecurityContext is invoked to return the security context of an existing process (that will persist after completing the request) to that of the peer-to-peer responder before the call to impersonate the remote initiator peer user. Accordingly, the remote peer may be treated like any other user within the trusted domain, i.e., a unique level of access rights may be granted to the remote peer. The invention thus overcomes the drawbacks of the heretofore described prior systems.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof. All references cited herein (including pending applications) are hereby incorporated by reference in their entireties.

What is claimed is:

1. A method for establishing a peer-to-peer relationship enabling a remote peer on a peer-to-peer network to access a resource, comprising:
   receiving a request from a remote peer to access a resource;
   accessing one or more security identification values, the one or more security identification values representing respectively one or more access rights of the remote peer in an access control system;
   generating an access token for the access control system, the access token comprising the one or more security identification values; and
   accessing the resource on behalf of the remote peer, the access control system determining the level of access to the resource based on said one or more access security identification values in said token.

2. A method according to claim 1, the access control system including a generic user security identification value, said generic user security identification value being associated with a generic user account, said access token including said generic user security identification value.

3. A method according to claim 2, the access control system including a plurality of resource groups, each of said groups being associated with one or more resources and one or more security identification values, said generic user identification value not being associated with any of said resource groups.

4. A method according to claim 2, comprising generating a second access token in response to a request from a second remote peer, the second access token comprising a data structure that includes the generic security identification value.

5. A method according to claim 2, comprising reverting from the generic user account upon termination of the execution thread.

6. A method according to claim 1, at least one of the one or more security identification values corresponding to a resource group.

7. A method according to claim 1, at least one of the one or more security identification values corresponding to a role in a resource group.

8. A method according to claim 1, comprising:
   receiving credentials from the remote peer, and
   generating the one or more security identification values for the remote peer based on the credentials.

9. A method according to claim 1, further comprising:
   creating a generic user account within the access control system;
   creating a generic user security identification value associated with the generic user account.

10. A method according to claim 9, the access control system including a plurality of resource groups, each of the resource groups being associated with one or more security identification values, the generic user security identification value not being associated with any of the resource groups.

11. A method according to claim 1, wherein the resource is a folder.

12. A method according to claim 1, wherein the resource is a file.

13. A method according to claim 1, wherein the resource is a printer.

14. A method according to claim 1, including;
   passing the duplicated access token to a separate operation in which the peer is requesting access to a resource.

15. A method according to claim 14, including:
   creating a handle, the handle comprising an identification value for the separate operation.

16. A computer program product for use on a computer connected to at least one other computer in a peer-to-peer networking environment, the computer having an access control system for determining the level of access to a resource based on one or more security identification values in an access token associated with an execution thread attempting to access the resource, the computer program product comprising:
   code for receiving a request to access a resource from a remote peer;
   code for accessing one or more security identification values which represent respectively one or more access rights of the remote peer in the access control system;
   code for generating an access token for use in conjunction with the access control system, the access token comprising the one or more security identification values; and
   code for accessing the resource on behalf of the remote peer.

17. A computer program product according to claim 16, the code for generating an access token comprising code for generating an access token for a generic user account in the access control system, the generic user account having a generic user security identification value, the access token including the generic user security identification value.

18. A computer program product according to claim 17, the computer program product including code for reverting from the generic user account upon termination of the execution thread.

19. A computer program product according to claim 16, the computer program product including code for receiving credentials from a remote peer, and code for generating one or more security identification values for the remote peer based on the credentials.

20. A computer program product according to claim 16, the computer program product including code for creating a generic user account within the access control system, and code for creating a generic user security identification value associated with the generic user account.

21. A computer program product according to claim 16, the computer program product including code for passing the access token to a separate operation in which the peer is requesting the access to a resource.

22. A computer program product according to claim 21, the computer program product including code for creating a handle, the handle comprising an identification value for the separate operation.

23. A computer program product comprising a computer readable medium having a computer executable program code disposed thereon, the code comprising:
- access control system code for determining the level of access to a resource based upon one or more security identification values in an access token;
- code for receiving a request to access a resource from a remote peer on a peer-to-peer network;
- code for accessing one or more security identification values, the one or more security identification values representing respectively one or more access rights of the remote peer for use in conjunction with the access control system;
- code for generating an access token, the access token including the one or more security identification values for use in conjunction with the access control system; and
- code for accessing the resource on behalf of the remote peer.

24. A computer program product for use on a computer connected to at least one other computer in a peer-to-peer networking environment, the computer having an access control system for determining the level of access to a resource based on one or more security identification value in an access token associated with an execution thread attempting to access the resource, the computer program product comprising:
- installation code for placing computer-readable program code onto a medium readable by the computer, the computer readable program code comprising:
  - code for receiving a request to access a resource from a remote peer;
  - code for accessing one or more security identification values which represent respectively one or more access rights of the remote peer in the access control system;
  - code for generating an access token for use in conjunction with the access control system, the access token comprising the one or more security identification value; and
  - code for accessing the resource on behalf of the remote peer.

25. A computer program product according to claim 24, the code for generating an access token comprising code for generating an access token for a generic user account in the access control system, the generic user account having a generic user security identification value, the access token including the generic user security identification value.

26. A computer program product according to claim 25, the computer readable program code including code for reverting from the generic user account upon termination of the execution thread.

27. A computer program product according to claim 24, the computer readable program code including code for receiving credentials from a remote peer, and code for generating one or more security identification values for the remote peer based on the credentials.

28. A computer program product according to claim 24, the computer readable program code including code for creating a generic user account within the access control system, and code for creating a generic user security identification value associated with the generic user account.

29. A computer program product according to claim 24, the computer readable program code including code for passing the access token to a separate operation in which the peer is requesting access to a resource.

30. A computer program product according to claim 29, the computer readable program code including code for creating a handle, the handle comprising an identification value for the separate operation.

31. A computer program product comprising a computer-readable medium having computer executable program code disposed thereon, the code comprising:
- installation code for placing computer-readable program code onto a medium readable by the computer, the computer readable program code comprising:
  - access control system code for determining the level of access to a resource based upon one or more security identification value in an access token;
  - code for receiving a request to access a resource from a remote peer on a peer-to-peer network;
  - code for accessing one or more security identification values, the one or more security identification values representing respectively one or more access rights of the remote peer for use in conjunction with the access control system;
  - code for generating an access token comprising the one or more security identification values for use in conjunction with the access control system; and
  - code for accessing the resource on behalf of the remote peer.

32. A computer having a computer program executing thereon, the computer program comprising executing computer-readable program code, the computer-readable code comprising:
- code for receiving a request to access a resource from a remote peer;
- code for accessing one or more security identification values which represent respectively one or more access rights of the remote peer in the access control system;
- code for generating an access token for use in conjunction with the access control system, the access token comprising the one or more security identification values; and
- code for initiating an execution thread for accessing the resource on behalf of the peer, the execution thread being associated with the access token.

33. A computer according to claim 32, the code for generating an access token comprising code for generating an access token for a generic user account in the access control system, the generic user account having a generic user security identification value, the access token including the generic user security identification value.

34. A computer according to claim 33, the computer-readable program code including code for reverting from the generic user account upon termination of the execution thread.

35. A computer according to claim 32, the computer-readable program code including code for receiving credentials from a remote peer, and code for generating one or more security identification values for the remote peer based on the credentials.

36. A computer according to claim 32, the computer-readable program code including code for creating a generic user account within the access control system and code for creating a generic user security identification value associated with the generic user account.

37. A computer according to claim 32, the computer-readable program code including code for passing the token to a separate operation in which the peer is requesting access to a resource.

38. A computer according to claim 37, the computer-readable program code including code for creating a handle, the handle an identification value for the separate operation.

39. A computer having a computer program executing thereon, the computer program comprising executing computer-readable program code, the computer-readable code comprising:
- access control system code for determining the level of access to a resource based upon one or more security identification values in an access token;
- code for receiving a request to access a resource from a remote peer on a peer-to-peer network;
- code for accessing one or more security identification values, the one or more security identification values representing respectively one or more access rights of the remote peer for use in conjunction with the access control system;
- code for generating an access token comprising the one or more security identification values for use in conjunction with the access control system; and
- code for accessing the resource on behalf of the remote peer.

40. A computer system comprising a peer-to-peer network, the peer-to-peer network comprising a plurality of computers, each of the computers being connected to at least one other computer on the peer-to-peer network, at least one of the computers having program code disposed on a medium readable by the computer, the program code comprising:
- code for receiving a request to access a resource from a remote peer;
- code for accessing one or more security identification values which represent respectively one or more access rights of the remote peer in the access control system;
- code for generating an access token for use in conjunction with the access control system, the access token comprising the one or more security identification values; and
- code for accessing the resource on behalf of the remote peer.

41. A computer system according to claim 40, the code for generating an access token comprising code for generating an access token for a generic user account in the access control system, the generic user account having a generic user security identification value, the access token including the generic user security identification value.

42. A computer system according to claim 41, the code including code for reverting from the generic user account upon termination of the execution thread.

43. A computer system according to claim 40, the code including code for receiving credentials from a remote peer, and code for generating one or more security identification values for the remote peer based on the credentials.

44. A computer system according to claim 40, the code including code for creating a generic user account within the access control system, and code for creating a generic user security identification value associated with the generic user account.

45. A computer system according to claim 40, the code including code for passing the token to a separate operation in which the peer is requesting access to a resource.

46. A computer system according to claim 45, the code including code for creating a handle, the handle comprising an identification value for the separate operation.

47. A computer system comprising a peer-to-peer network, the peer-to-peer network comprising a plurality of computers, each of the computers being connected to at least one other computer on the peer-to-peer network, at least one of the computers having program code disposed on a medium readable by the computer, the program code comprising:
- access control system code for determining the level of access to a resource based upon one or more security identification values in an access token;
- code for receiving a request to access a resource from a remote peer on a peer-to-peer network;
- code for accessing one or more security identification values, the one or more security identification values representing respectively one or more access rights of the remote peer for use in conjunction with the access control system;
- code for generating an access token comprising the one or more security identification values for use in conjunction with the access control system; and
- code for accessing the resource on behalf of the remote peer.

* * * * *